United States Patent
Ni et al.

(10) Patent No.: US 10,738,159 B2
(45) Date of Patent: Aug. 11, 2020

(54) FLAME RETARDANT THERMOPLASTIC POLYURETHANE RESIN COMPOSITION

(71) Applicant: ADEKA CORPORATION, Tokyo (JP)

(72) Inventors: Yang Ni, Saitama (JP); Naoko Tanji, Saitama (JP); Yutaka Yonezawa, Saitama (JP); Yohei Inagaki, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 16/071,989

(22) PCT Filed: Feb. 13, 2017

(86) PCT No.: PCT/JP2017/005098
§ 371 (c)(1),
(2) Date: Jul. 23, 2018

(87) PCT Pub. No.: WO2017/159161
PCT Pub. Date: Sep. 21, 2017

(65) Prior Publication Data
US 2019/0031829 A1   Jan. 31, 2019

(30) Foreign Application Priority Data
Mar. 14, 2016 (JP) .................. 2016-049471

(51) Int. Cl.
| | | |
|---|---|---|
| *C08G 71/04* | (2006.01) | |
| *C08K 3/36* | (2006.01) | |
| *C08K 5/52* | (2006.01) | |
| *C08K 3/22* | (2006.01) | |
| *C08K 5/3462* | (2006.01) | |
| *C08K 5/3477* | (2006.01) | |
| *C08L 75/08* | (2006.01) | |
| *C08K 5/529* | (2006.01) | |
| *C08K 13/02* | (2006.01) | |
| *C08L 75/04* | (2006.01) | |

(52) U.S. Cl.
CPC ............... *C08G 71/04* (2013.01); *C08K 3/22* (2013.01); *C08K 3/36* (2013.01); *C08K 5/3462* (2013.01); *C08K 5/3477* (2013.01); *C08K 5/52* (2013.01); *C08K 5/529* (2013.01); *C08K 13/02* (2013.01); *C08L 75/08* (2013.01); *C08L 75/04* (2013.01)

(58) Field of Classification Search
None
See application file for complete search history.

(56) References Cited

U.S. PATENT DOCUMENTS

| | | |
|---|---|---|
| 7,834,071 B2 | 11/2010 | Kanno et al. |
| 7,855,281 B2 | 12/2010 | Kanno et al. |
| 9,926,434 B2 | 3/2018 | Ni et al. |
| 2008/0153694 A1* | 6/2008 | Nishi ............... C01B 33/128 502/401 |
| 2009/0048377 A1 | 2/2009 | Kanno et al. |
| 2009/0105382 A1 | 4/2009 | Kanno et al. |
| 2010/0249286 A1 | 9/2010 | Yamaki et al. |
| 2015/0337204 A1 | 11/2015 | Yamazaki et al. |
| 2017/0121502 A1 | 5/2017 | Ni et al. |

FOREIGN PATENT DOCUMENTS

| | | |
|---|---|---|
| CN | 104870613 A | 8/2015 |
| JP | 2015-042730 | 3/2015 |
| WO | WO 2006/126393 | 11/2006 |
| WO | WO 2006/126528 | 11/2006 |
| WO | WO 2015/162982 | 10/2015 |

OTHER PUBLICATIONS

International Search Report, PCT/JP2017/005098, dated Mar. 28, 2017.

\* cited by examiner

*Primary Examiner* — Robert T Butcher
(74) *Attorney, Agent, or Firm* — Young & Thompson

(57) ABSTRACT

A flame-retardant thermoplastic polyurethane resin composition is provided, containing: a thermoplastic polyurethane resin; at least one melamine salt selected from the group consisting of melamine orthophosphate, melamine pyrophosphate, and melamine polyphosphate; at least one piperazine salt selected from the group consisting of piperazine orthophosphate, piperazine pyrophosphate, and piperazine polyphosphate; and wet process silica having an oil absorption of 200 ml/100 g or more. The composition preferably contains zinc oxide.

8 Claims, No Drawings

FLAME RETARDANT THERMOPLASTIC POLYURETHANE RESIN COMPOSITION

TECHNICAL FIELD

This invention relates to a thermoplastic polyurethane resin composition having excellent flame retardancy with intact resin-specific physical properties.

BACKGROUND ART

Thermoplastic polyurethane (hereinafter TPU) resins are composed of easily movable long-chain units called soft segments and extremely crystalline units called hard segments and exhibit excellent physical properties ascribed to this characteristic structure, such as elasticity, elongation, mechanical strength, and abrasion resistance. With these physical properties taken into advantage, TPU resins have been used in a variety of fields as, for example, hoses, belts, wires, cables, pipes, soles, automotive interior and exterior trim, and various moldings.

A TPU resin is compounded with a flame retardant to be rendered flame-retardant. The use of a halogen flame retardant has the problem of harmful gas generation on combustion. It is known to use instead a nitrogen- and/or phosphorus-containing compound, such as melamine phosphate, melamine polyphosphate, or a condensed phosphoric ester, as a halogen-free flame retardant.

It is also proposed to use an intumescent phosphate flame retardant that swells on combustion to form a swollen surface layer, which prevents diffusion of a decomposition product and heat transfer thereby to achieve flame retardation. In order to further enhance the flame retardation effect, a combined use of these flame retardants with silicon oxide has also been proposed (see Patent Literatures 1 and 2 below).

The problem with the use of silicon oxide is that some types of silicon oxide bring about no improvement on flame retardation effect. Accordingly, a flame retardant aid that surely improves flame retardation effect has been sought.

CITATION LIST

Patent Literature

Patent Literature 1: JP 2015-042730A
Patent Literature 2: US 2010/249286A

SUMMARY OF INVENTION

An object of the invention is to provide a TPU resin composition having excellent flame retardancy.

As a result of extensive investigations, the inventors have reached the present invention. The invention provides a flame-retardant thermoplastic polyurethane resin composition comprising a thermoplastic polyurethane resin and components (A), (B), and (C):

(A) at least one melamine salt selected from the group consisting of melamine orthophosphate, melamine pyrophosphate, and melamine polyphosphate, (B) at least one piperazine salt selected from the group consisting of piperazine orthophosphate, piperazine pyrophosphate, and piperazine polyphosphate, and (C) wet process silica having an oil absorption of 200 ml/100 g or more.

The invention provides also provides a molded article obtained from the flame-retardant thermoplastic polyurethane resin composition.

DESCRIPTION OF EMBODIMENTS

The flame-retardant TPU resin composition of the invention will be described on the basis of its preferred embodiments. The invention relates to a flame-retardant TPU resin composition. As used herein, the terminology "flame-retardant" means having resistance to ignition, being ignitable but allowing only a very low speed of flame spread, or being ignitable but self-distinguishing, and preferably means meeting at least V-2 classification according to the UL94 standard specifically described later in Examples. The term "flame-retardant thermoplastic polyurethane (TPU) resin composition" denotes a composition containing at least one flame retardant component and at least one TPU resin.

The TPU resin that can be used in the flame-retardant TPU resin composition of the invention is described first.

The TPU resin that can be used in the invention is a rubber-like elastomer having a urethane group (—NHCOO—) in the molecular structure. It is made up of easily movable long-chain units called soft segments and extremely crystalline units called hard segments and is generally prepared using a polyol, a diisocyanate, and a chain extender.

TPU resins are largely classified according to molding methods into castable liquid TPU resins that are injectable into a mold for cure reaction, millable gum that is processable (milling and press forming) like conventional rubber, and those processable in the same manner as for general thermoplastic resins. Any of these types of TPU resins can be used in the invention with no distinction.

The TPU resin for use in the invention preferably has a melt flow index (MFI) of 3 to 60 g/10 min, more preferably 5 to 40 g/10 min. A TPU resin with an MFI lower than 3 g/10 min can be difficult to process, and a TPU resin having an MFI higher than 60 g/10 min can produce molded articles with reduced physical properties.

The MFI of TPU resins is measured at 190° C. and 10 kg in accordance with ASTM D1238.

Examples of the polyol include polyester polyols, polyester ether polyols, polycarbonate polyols, and polyether polyols.

Examples of the polyester polyols include those obtained by dehydration condensation between components (i) and (ii) below; and polylactone diols obtained by ring-open polymerization of a lactone monomer, such as ε-caprolactone.

(i) an aliphatic dicarboxylic acid (e.g., succinic acid, adipic acid, sebacic acid, or azelaic acid), an aromatic dicarboxylic acid (e.g., phthalic acid, terephthalic acid, isophthalic acid, or naphthalenedicarboxylic acid), an alicyclic dicarboxylic acid (e.g., hexahydrophthalic acid, hexahydroterephthalic acid, or hexahydroisophthalic acid), or an acid ester or anhydride thereof (ii) ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,3-octanediol, 1,9-nonanediol, or a like polyol, or a mixture of these polyols Examples of the polyester ether polyols include those obtained by dehydration condensation between components (iii) and (iv) below.

(iii) an aliphatic dicarboxylic acid (e.g., succinic acid, adipic acid, sebacic acid, or azelaic acid), an aromatic dicarboxylic acid (e.g., phthalic acid, terephthalic acid, isophthalic acid, or naphthalenedicarboxylic acid), an alicyclic dicarboxylic acid (e.g., hexahydrophthalic acid, hexahydroterephthalic acid, or hexahydroisophthalic acid), or an acid ester or anhydride thereof (iv) a glycol, such as diethylene glycol or a propylene oxide adduct, or a mixture of these glycols Examples of the polycarbonate polyols include those obtained by the reaction between components (v) and (vi) below.

(v) at least one polyhydric alcohol (e.g., ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, or diethylene glycol)

(vi) diethylene carbonate, dimethyl carbonate, diethyl carbonate, or the like

Copolymers of polycaprolactone polyol (PCL) and polyhexamethylene carbonate (PHL) are also useful as the polycarbonate polyol.

Examples of the polyether polyols include those obtained by polymerization of cyclic ethers (e.g., ethylene oxide, propylene oxide, and tetrahydrofuran), such as polyethylene glycol, polypropylene glycol, and polytetramethylene ether glycol; and their copolyethers.

Examples of the diisocyanate include tolylene diisocyanate (TDI), 4,4'-diphenylmethane diisocyanate (MDI), 1,5-naphthalene diisocyanate (NDI), tolidine diisocyanate, 1,6-hexamethylene diisocyanate (HDI), isophorone diisocyanate (IPDI), xylylene diisocyanate (XDI) hydrogenated XDI, triisocyanate, tetramethylxylene diisocyanate (TMXDI), 1,6,11-undecane triisocyanate, methyloctane 1,8-diisocyanate, lysine ester triisocyanate, 1,3,6-hexamethylene triisocyanate, bicycloheptane triisocyanate, and dicyclohexylmethane diisocyanate (hydrogenated MDI or HMDI).

Preferred among them are 4,4'-diphenylmethane diisocyanate (MDI) and 1,6-hexamethylene diisocyanate (HDI).

A low molecular weight polyol may be used as the chain extender in the preparation of the TPU resin. Examples of the low molecular polyol include aliphatic polyols, such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, 1,4-cyclohexanedimethanol, and glycerol; and aromatic glycols, such as 1,4-dumethyrolbenzene, bisphenol A, and bisphenol A ethylene oxide or propylene oxide adducts.

Specific examples of the TPU resin include ester (lactone) based polyurethane copolymers, ester (adipate) based polyurethane copolymers, ether based polyurethane copolymers, carbonate based polyurethane copolymers, and ether/ester based polyurethane copolymers. These TPU resins may be used either individually or in combination thereof.

Specific examples of a commercially available product of the TPU resin are mentioned below.

Examples of commercially available ester (lactone) based polyurethane copolymers include Elastollan C80A10 (from BASF Japan), Elastollan C80A50 (from BASF Japan) and Resamine P-4000 and P-4500 series (from Dainichiseika Color & Chemicals Mfg. Co., Ltd.).

Examples of commercially available ester (adipate) based polyurethane copolymers include Pandex T-5000V (DIC Bayer Polymer Ltd.), Pandex TR-3080 (from DIC Bayer Polymer Ltd.), and Resamine P-1000 and P-7000 series (from Dainichiseika Color & Chemicals Mfg. Co., Ltd.).

Examples of commercially available ether based polyurethane copolymers include Elastollan 1180A50 (from BASF Japan Ltd.), Pandex T-8180 (from DIC Bayer Polymer Ltd.), Pandex T-8283 (from DIC Bayer Polymer Ltd.), Pandex T-1190 (from DIC Bayer Polymer Ltd.), and Resamine P-2000 series (from Dainichiseika Color & Chemicals Mfg. Co., Ltd.).

Examples of commercially available carbonate based polyurethane copolymers include Pandex T-7890N (from DIC Bayer Polymer Ltd.).

Examples of commercially available ether/ester based polyurethane copolymers include Desmopan DesKU2-88586 (from DIC Bayer Polymer Ltd.) and Resamine P-800 series (from Dainichiseika Color & Chemicals Mfg. Co.).

In view of good balance between versatility and resin physical properties, preferred of the TPU resins described above are polyether polyol polyurethane resins, polyester polyol polyurethane resins, and polyester ether polyol polyurethane resins. In terms of resistance to hydrolysis, polyether polyol polyurethane resins and polyester ether polyol polyurethane resins are more preferred.

The content of the TPU resin in the flame-retardant TPU resin composition of the invention is preferably 40 to 95 mass %, more preferably 45 to 90 mass %, even more preferably 50 to 85 mass %.

The flame retardant components used in the flame-retardant TPU resin composition of the invention will then be described.

The melamine salt of component (A) used as a flame retardant is selected from the group consisting of melamine orthophosphate, melamine pyrophosphate, and melamine polyphosphate. These melamine salts may be used either individually or in combination.

Preferred of them is melamine pyrophosphate in terms of flame retardancy. When two or more of the melamine salts are used in combination, the higher proportion of melamine pyrophosphate is preferred. The molar ratio of pyrophosphoric acid to melamine in melamine pyrophosphate is preferably 1:1.5 to 1:2.5, more preferably 1:2.

While these melamine phosphates may be obtained by the reaction between a corresponding phosphoric acid or phosphate and melamine, it is preferable to use as component (A) melamine pyrophosphate or melamine polyphosphate, particularly melamine pyrophosphate, obtained by heat-condensation of monomelamine orthophosphate.

The piperazine salt of component (B) used as a flame retardant is selected from the group consisting of piperazine orthophosphate, piperazine pyrophosphate, and piperazine polyphosphate. These piperazine salts may be used either individually or in combination.

Preferred of them is piperazine pyrophosphate for flame retardation. When two or more piperazine salts are used as component (B) in combination, the higher proportion of piperazine pyrophosphate is preferred. The molar ratio of pyrophosphoric acid to piperazine in piperazine pyrophosphate is preferably 1:0.5 to 1:1.5, more preferably 1:1.

While these piperazine phosphates may be obtained by the reaction between a corresponding phosphoric acid or phosphate and piperazine, it is preferable to use as component (B) piperazine pyrophosphate or piperazine polyphosphate, particularly piperazine pyrophosphate, obtained by heat-condensation of monopiperazine bis orthophosphate.

The content of component (A) in the flame-retardant TPU resin composition is preferably 3 to 29 mass %, more preferably 5 to 24 mass %, even more preferably 6 to 22 mass %. The content of component (B) in the flame-retardant TPU resin composition is preferably 9 to 46 mass %, more preferably 14 to 38 mass %, even more preferably 16 to 35 mass %.

In order to achieve high flame retardation without impairing the physical properties of the resin, the sum of the contents of components (A) and (B) in the TPU resin composition is preferably 20 to 60 mass %, more preferably 30 to 50 mass %, even more preferably 35 to 45 mass %. If the sum is less than 20 mass %, the TPU resin composition may fail to exhibit sufficient flame retardancy. If the sum exceeds 60 mass %, the physical properties intrinsic to the TPU resin can reduce.

The compounding mass ratio of component (A) to component (B), (A)/(B), is preferably 20/80 to 50/50, more preferably 30/70 to 50/50.

Component (C) used in the invention will next be described.

Component (C) is wet process silica having a specific oil absorption. Wet process silica not only functions as a flame retardant aid that enhances the flame retardation effect but also exhibits anti-dripping effect. Such function and effect are not obtained with dry process silica. In addition, wet process silica easily forms clusters, which is advantageous for improving dispersibility in the resin.

Wet process silica for use in the invention is prepared by the wet process involving neutralization between a silicate and an acid to form active silica, which is flocculated and precipitated to yield hydrous silica. Dry process silica, on the other hand, is prepared by the gas phase process, specifically by the combustion of silicon tetrachloride together with hydrogen and oxygen.

The wet process silica for use in the invention is not limited by the preparation process and may be either precipitated silica or silica gel.

The wet process silica as component (C) has an oil absorption of at least 200 ml/100 g, preferably 200 to 400 ml/100 g. If the oil absorption of the wet process silica is less than 200 ml/100 g, the anti-dripping effect will be insufficient. The oil absorption of the wet process silica is measured in accordance with JIS K5101.

The wet process silica for use in the invention may be of a single type or a mixture of two or more different types thereof.

Examples of commercially available wet-process silica include Nipsil series from Tosoh Silica Corp., SIPERNAT series from Evonik, CARPLEX series from DSL, Japan, Ultrasil series from Evonik, SILENE 732 from PPG, Hi-Sil series from PPG, Agilon series from PPG, Zeosil series from Solvay, TOKUSIL series from OSC Japan, EECOSIL series from OSC Japan, OSC series from OSC Japan, FINESIL series from OSC Japan, OSCMATT series from OSC Japan, MIZUKASIL series from Mizusawa Ind. Chemicals, Sylysia series from Fuji Silysia Chemical, Sylophobic series from Fuji Silysia Chemical, SYLOID series from W. R. Grace, GASIL series from PQ Corp., SiLCRON series from PQ Corp., and NIPGEL series from Tosoh Silica.

The content of component (C) in the flame-retardant TPU resin composition is 0.01 to 10 mass %, preferably 0.1 to 8 mass %, more preferably 0.5 to 6 mass %. With a content less than 0.01 mass %, the anti-dripping effect and the flame retardancy may be insufficient. With a content more than 10 mass %, component (C) can reduce the intrinsic physical properties of the resin.

In order to further improve the flame retardancy, it is preferred for the flame-retardant TPU resin composition of the invention to further contain zinc oxide (ZnO) (hereinafter also referred to as component (D)).

Zinc oxide may be surface treated. Commercially available zinc oxide products may be used, including JIS class 1 zinc oxide available from Mitsui Mining and Smelting Co. Ltd., partially coated zinc oxide available from Mitsui Mining and Smelting Co. Ltd., Nanofine 50 (ultrafine zinc oxide with average particle diameter of 0.02 μm) from Sakai Chemical Industries Ltd., and Nanofine K (ultrafine zinc silicate-coated zinc oxide with average particle diameter of 0.02 μm) from Sakai Chemical Industries Ltd.

The content of zinc oxide as component (D) is preferably 0.1 to 10 parts, more preferably 0.5 to 5.0 parts, even more preferably 1.0 to 3.0 parts, by mass per 100 parts by mass of the TPU resin composition.

The flame-retardant TPU resin composition of the invention may further contain a silicone oil with a view to reducing secondary agglomeration and improving water resistance. Examples of suitable silicone oils include dimethyl silicone oil (polysiloxane having methyl as all the side groups and both end groups), methyl phenyl silicone oil (polysiloxane having phenyl as part of side groups), methyl hydrogen silicone oil (polysiloxane having hydrogen at part of side chains), and copolymers of these siloxanes. Modified silicone oils may be used, which are obtained by introducing an organic group to part of the side chains and/or ends of the polysiloxanes described above, such as amine-, epoxy-, alicyclic epoxy-, carboxyl-, carbinol-, mercapto-, polyether-, long chain alkyl-, fluoroalkyl-, higher fatty acid ester-, higher fatty acid amide-, silanol-, diol-, phenol- and/or aralkyl-modified silicone oils.

Examples of useful silicone oils include KF-96, KF-965, and KF-968, all from Shin-Etsu Chemical Co., Ltd. (as dimethyl silicone oil); KF-99 and KF-9901, both from Shin-Etsu Chemical, HMS-151, HMS-071, HMS-301, and DMS-H21, all from Gelest (as methyl hydrogen silicone oil and a silicone oil having a methyl hydrogen polysiloxane structure); KF-50, KF-53, KF-54, and KF-56, all from Shin-Etsu Chemical (as methyl phenyl silicone oil); X-22-343, X-22-2000, KF-101, KF-102, and KF-1001, all from Shin-Etsu Chemical (as epoxy-modified silicone oils); X-22-3701E from Shin-Etsu Chemical (as carboxyl-modified silicone oil); X-22-4039 and X-22-4015, both from Shin-Etsu Chemical (as carbinol-modified silicone oil); and KF-393 from Shin-Etsu Chemical (as amine-modified silicone oil).

The flame-retardant TPU resin composition of the invention may further contain a silane coupling agent. A silane coupling agent is a compound having an organic functional group and a hydrolysable group and is represented by, for example, general formula: $A-(CH_2)_k-Si(OR)_3$, wherein A is an organic functional group; k is a number of 1 to 3, and R is methyl or ethyl. The organic group as A may be epoxy, vinyl, methacryl, amino, or mercapto. For use in the invention, a silane coupling agent having an epoxy group is preferred.

The flame-retardant TPU resin composition of the invention may further contain a polyhydric alcohol compound as a flame retardant aid. A polyhydric alcohol compound is a compound having a plurality of hydroxyl groups, such as pentaerythritol, dipentaerythritol, tripentaerythritol, polypentaerythritol, neopentyl glycol, trimethylolpropane, ditrimethylolpropane, 1,3,5-tris(2-hydroxyethyl) isocyanurate (THEIC), polyethylene glycol, glycerol, Diglycerol, mannitol, maltitol, lactitol, sorbitol, erythritol, xylitol, xylose, sucrose, trehalose, inositol, fructose, maltose, and lactose. Among these, at least one compound selected from the group consisting of pentaerythritol and pentaerythritol condensates, such as dipentaerythritol, tripentaerythritol, and higher condensates (polypentaerythritol) is preferably used. Dipentaerythritol and other pentaerythritol condensates are more preferred. Dipentaerythritol is most preferred. THEIC and sorbitol are also preferably used.

The content of the polyhydric alcohol, if used, is preferably 0.01 to 10.0 parts, more preferably 1.0 to 7.0 parts, even more preferably 1.5 to 3.0 parts, by mass per 100 parts by mass of the TPU resin.

The flame retardant TPU resin composition of the invention may preferably contain a lubricant according to necessity. Examples of useful lubricants include pure hydrocarbon lubricants, such as liquid paraffins, natural paraffins, microwaxes, synthetic paraffins, low-molecular polyethylenes, and polyethylene waxes; halogenated hydrocarbon lubricants; fatty acid lubricants, such as higher fatty acids and oxy fatty acids; fatty acid amide lubricants, such as fatty acid amides and bis-fatty acid amides; ester lubricants, such as lower alcohol esters of fatty acids, polyhydric alcohol esters of fatty acids (e.g., glycerides), polyglycol esters of fatty acids, and fatty alcohol esters of fatty acids (ester waxes); metal soaps; fatty alcohols; polyhydric alcohols; polyglycols; polyglycerols; partial esters of fatty acids and polyhydric alcohols; partial esters of fatty acids and polyglycol or polyglycerol; silicone oils; and mineral oils.

The amount of the lubricant to be added is preferably 0.01 to 5 parts, more preferably 0.3 to 2 parts, by mass per 100 parts by mass of the TPU resin.

Where needed, the flame retardant TPU resin composition of the invention may contain one or more halogen-free organic or inorganic flame retardants or flame retardant aids as long as it does not impair the effects of the invention. Examples of useful flame retardants and flame retardant aids include triazine ring-containing compounds, metal hydroxides, phosphoric ester flame retardants, condensed phosphoric ester flame retardants, phosphate flame retardants, inorganic phosphorus flame retardants, dialkyl phosphinates, silicone flame retardants, metal oxides, boric acid compounds, thermally expandable graphite, other inorganic flame retardant aids, and other organic flame retardants.

Examples of the triazine ring-containing compounds include melamine, ammeline, benzoguanamine, acetoguanamine, phthalodiguanamine, melamine cyanurate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxides include magnesium hydroxide, aluminum hydroxide, calcium hydroxide, barium hydroxide, zinc hydroxide and KISUMA 5A (trade mark; magnesium hydroxide available from Kyowa Chemical Industry Co., Ltd.).

Examples of the phosphoric ester flame retardants include trimethyl phosphate, triethyl phosphate, tributyl phosphate, tributoxyethyl phosphate, trichloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, trisisopropylphenyl phosphate, 2-ethylhexyldiphenyl phosphate, t-butylphenyldiphenyl phosphate, bis(t-butylphenyl)phenyl phosphate, tris(t-butylphenyl)phosphate, isopropylphenyldiphenyl phosphate, bis(isopropylphenyl)diphenyl phosphate, and tris(isopropylphenyl)phosphate.

Examples of the condensed phosphoric ester flame retardants include 1,3-phenylene bis(diphenyl phosphate), 1,3-phenylene bis(dixylenyl phosphate), and bisphenol A bis(diphenyl phosphate).

Examples of the inorganic phosphorus flame retardants include red phosphorus.

Examples of the dialkyl phosphinates include aluminum diethyl phosphinate and zinc diethyl phosphinate.

Examples of the other inorganic flame retardant aids include inorganic compounds, such as titanium oxide, aluminum oxide, magnesium oxide, and hydrotalcite; and their surface-treated products. Various commercially available products of these flame retardant aids may be used, including TIPAQUE R-680 (trade mark; titanium oxide from Ishihara Sangyo Kaisha, Ltd.), KYOWA MAG 150 (trade mark; magnesium oxide from Kyowa Chemical Industry Co., Ltd.), DHT-4A (hydrotalcite from Kyowa Chemical Industry Co., Ltd.), and ALCAMIZER 4 (trade mark; zinc-modified hydrotalcite from Kyowa Chemical Industry Co., Ltd.).

If desired, the frame retardant TPU resin composition of the invention may contain a phenol antioxidant, a phosphorus antioxidant, a thioether antioxidant, an ultraviolet absorber, a hindered amine light stabilizer, a deterioration inhibitor, and so forth.

Examples of the phenol antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene bis[(3,5-di-tert-butyl-4-hydroxyphenyl)propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, tetrakis[3-(3,5-di-tert-butyl-4-hydroxyphenyl)propionic acid methyl]methane, thiodiethylene glycol bis[(3,5-di-tert-butyl-4-hydroxyphenyl)propionate], 1,6-hexamethylene bis[(3,5-di-tert-butyl-4-hydroxyphenyl)propionate], bis[3,3-bis(4-hydroxy-3-tert-butylphenyl)butyric acid] glycol ester, bis[2-tert-butyl-4-methyl-6-(2-hydroxy-3-tert-butyl-5-methylbenzyl)phenyl] terephthalate, 1,3,5-tris[(3,5-di-tert-butyl-4-hydroxyphenyl)propionyloxyethyl] isocyanurate, 3,9-bis[1,1-dimethyl-2-{(3-tert-butyl-4-hydroxy-5-methylphenyl) propionyloxy}ethyl]-2,4,8,10-tetraoxaspiro[5,5]undecane, and triethylene glycol bis[(3-tert-butyl-4-hydroxy-5-methylphenyl)propionate].

The phenol antioxidant is added in an amount of preferably 0.001 to 10 parts, more preferably 0.05 to 5 parts, by mass per 100 parts by mass of the TPU resin.

Examples of the phosphorus antioxidant include trisnonylphenyl phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene 10-oxide, 2,2'-methylenebis(4,6-tert-butylphenyl)-2-ethylhexyl phosphite, 2,2'- methylenebis(4,6-tert-butylphenyl)octadecyl phosphite, 2,2'-ethylidenebis(4,6-di-tert-butylphenyl) fluorophosphite, tris(2-[(2,4,8,10-tetrakis-tert-butyldibenzo[d,f][1,3,2]dioxaphosphepin-6-yl)oxy]ethyl)amine, phosphite of 2-ethyl-2-butylpropylene glycol and 2,4,6-tri-tert-butylphenol, and tris(2,4-di-tert-butylphenyl) phosphite.

The amount of the phosphorus antioxidant to be added is preferably 0.001 to 10 parts, more preferably 0.05 to 5 parts, by mass 100 parts by mass of the TPU resin.

Examples of the thioether antioxidant include dialkyl thiodipropionates, such as dilauryl thiodipropionate, dimyristyl thiodipropionate, and distearyl thiodipropionate, and a pentaerythritol tetra(β-alkylthiopropionate).

The amount of the thioether antioxidant to be added is preferably 0.001 to 10 parts, more preferably 0.05 to 5 parts, by mass per 100 parts by mass of the TPU resin.

Examples of the UV absorber include 2-hydroxybenzophenones, such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2'-hydroxyphenyl)benzotriazoles, such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-(benzotriazolyl)phenol), and 2-(2'-hydroxy-3'-tert-butyl-5'-carboxyphenyl)benzotriazole; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; substituted oxanilides, such as 2-ethyl-2'-ethoxyoxanilide and 2-ethoxy-4'-dodecyloxanilide; cyanoacrylates, such as ethyl α-cyano-β,β-diphenylacrylate and methyl 2-cyano-3-methyl-3-(p-methoxyphenyl)acrylate; and triaryl triazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine.

The amount of the UV absorber to be added is preferably 0.001 to 30 parts, more preferably 0.05 to 10 parts, by mass per 100 parts by mass of the TPU resin.

Examples of the hindered amine light stabilizer include hindered amine compounds, such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-pentamethyl-4-piperidyl) sebacate, bis(1-oxtoxy-2,2,6,6-tetramethyl-4-piperidy) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidyl)di(tridecyl) 1,2,3,4-butanetetracarboxylate, bis(1,2,2,6,6-pentamethyl-4-piperidyl)di(tridecyl) 1,2,3,4-butanetetracarboxylate, bis(1,2,2,4,4-pentamethyl-4-piperidyl) 2-butyl-2-(3,5-di-tert-butyl-4-hydroxybenzyl) malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyeamino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl]aminoundecane, and 1,6,11-tris[2,4-bis(N-butyl-N-(1,2,2,6,6-pentamethyl-4-piperidyeamino)-s-triazin-6-yl]aminoundecane.

The amount of the hindered amine light stabilizer to be added is preferably 0.001 to 30 parts, more preferably 0.05 to 10 parts, by mass per 100 parts by mass of the TPU resin.

Examples of the deterioration inhibitor include naphthylamines, diphenylamines, p-phenyldiamines, quinolines, hydroquinone derivatives, monophenols, thiobisphenols, hindered phenols, and phosphite esters. The amount of the deterioration inhibitor to be added is preferably 0.001 to 10 parts by mass, more preferably 0.05 to 5 parts by mass, per 100 parts by mass of the TPU resin.

The flame retardant TPU resin composition of the invention may optionally contain a reinforcing material as long as it does not impair the effects of the invention. The reinforcing material may have a fibrous, plate-like, granular, or powder form as is usual for application to synthetic resins. Specific examples of useful reinforcing materials include inorganic fibrous reinforcing materials, such as glass fiber, asbestos fiber, carbon fiber, graphite fiber, metal fiber, potassium titanate whisker, aluminum borate whisker, magnesium whisker, silicon whisker, wollastonite, sepiolite, asbestos, slag fiber, zonolite, ellestadite, gypsum fiber, silica fiber, silica alumina fiber, zirconia fiber, boron nitride fiber, silicon nitride fiber, and boron fiber; organic fibrous reinforcing materials, such as polyester fiber, nylon fiber, acrylic fiber, regenerated cellulose fiber, acetate fiber, kenaf, ramie, cotton, jute, hemp, sisal, flax, linen, silk, Manila fiber, sugarcane, wooden pulp, waste paper, used paper, and wool; and plate-like or granular reinforcing materials, such as glass flake, non-swellable mica, graphite, metal foil, ceramic beads, clay, mica, sericite, zeolite, bentonite, dolomite, kaolin, silicic acid powder, feldspar powder, potassium titanate, shirasu balloon, calcium carbonate, magnesium carbonate, barium sulfate, calcium oxide, aluminum oxide, titanium oxide, aluminum silicate, gypsum, novaculite, dawsonite, and white clay. The reinforcing material may have been coated or sized with a thermoplastic resin, such as an ethylene-vinyl acetate copolymer, or a thermosetting resin, such as an epoxy resin, or may have been treated with a coupling agent, such as an amino silane or an epoxysilane.

The flame retardant TPU resin composition of the invention may optionally contain a sheet silicate as long as it does not adversely affect the effects of the invention. Examples of suitable sheet silicates include smectite clay minerals, such as montmorillonite, saponite, hectorite, beidellite, stevensite, and nontronite, vermiculite, halloysite, swelling mica, and talk. The sheet silicate may have an organic cation, a quaternary ammonium cation, or a phosphonium cation pre-intercalated between the layers thereof.

The flame retardant TPU resin composition of the invention may optionally contain a crystal nucleating agent as long as it does not adversely affect the effects of the invention. Any crystal nucleating agents commonly employed for polymers may be used as appropriate. In the invention, either of an inorganic crystal nucleating agent and an organic crystal nucleating agent may be used.

Examples of the inorganic crystal nucleating agent include kaolinite, synthetic mica, clay, zeolite, graphite, carbon black, magnesium oxide, titanium oxide, calcium sulfide, boron nitride, calcium carbonate, barium sulfate, aluminum oxide, neodymium oxide, and metal salts of phenyl phosphonate and the like. The inorganic crystal nucleating agent may be modified with an organic substance so as to have improved dispersibility in the composition.

Examples of the organic nucleating agent include metal salts of organic carboxylic acids, such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, and sodium cyclohexanecarboxylate; organic sulfonic acid salts, such as sodium p-toluenesulfonate and sodium sulfoisophthalate; carboxylic amides, such as stearamide, ethylenebislauramide, palmitamide, hydroxystearamide, erucamide, and trimesic acid tris(tert-butyramide); benzylidenesorbitol and its derivatives, metal salts of phosphorus compounds, such as sodium 2,2'-methylenebis(4,6-di-tert-butylphenyl)phosphate; and sodium 2,2-methylbis(4,6-di-tert-butylphenyl).

The flame retardant TPU resin composition of the invention may optionally contain a plasticizer as long as it does not impair the effects of the invention. Any plasticizers that are commonly used for polymers may be used as appropriate, including polyester plasticizers, glycerol plasticizers, polycarboxylic ester plasticizers, polyalkylene glycol plasticizers, and epoxy plasticizers.

Examples of the polyester plasticizers include those formed of an acid component, such as adipic acid, sebacic acid, terephthalic acid, isophthalic acid, naphthalenedicarboxylic acid, diphenyldicarboxylic acid, or rosin, and a diol component, such as propylene glycol, 1,3-butanediol, 1,4-butanediol, 1,6-hexanediol, ethylene glycol, or diethylene glycol; and those composed of a hydroxycarboxylic acid, such as polycaprolactone. These polyesters may be terminated with a monofunctional carboxylic acid or a monofunctional alcohol, or may be terminated with an epoxy compound.

Examples of the glycerol plasticizers include glycerol monoacetomonolaurate, glycerol diacetomonolaurate, glycerol monoacetomonostearate, glycerol diacetomonooleate, and glycerol monoacetomonomontanate.

Examples of the polycarboxylic ester plasticizer include phthalates, such as dimethyl phthalate, diethyl phthalate, dibutyl phthalate, dioctyl phthalate, diheptyl phthalate, dibenzyl phthalate, and butyl benzyl phthalate; trimellitates, such as tributyl trimellitate, trioctyl trimellitate, and trihexyl trimellitate; adipates, such as diisodecyl adipate, n-octyl n-decyl adipate, methyl diglycol butyl diglycol adipate, benzyl methyl diglycol adipate, and benzyl butyl diglycol adipate; citrates, such as triethyl acetylcitrate and tributyl acetylcitrate; azelates, such as di-2-ethylhexyl azelate; and sebacates, such as dibutyl sebacate and di-2-ethylhexyl sebacate.

Examples of the polyalkylene glycol plasticizers include polyalkylene glycols, such as polyethylene glycol, polypropylene glycol, a poly(ethylene oxide-propylene oxide) block and/or random copolymer, polytetramethylene glycol, ethylene oxide addition polymers of bisphenols, propylene oxide addition polymers of bisphenols, and tetrahydrofuran addition polymers of bisphenols; and their end-blocked compounds, such as end epoxy-modified compounds, end ester-modified compounds, and end ether-modified compounds.

The term "epoxy plasticizer" generally refers to epoxy triglycerides composed of epoxy alkyl stearate and soy bean oil. What we call epoxy resins prepared mainly from bisphenol A and epichlorohydrin are also useful.

Examples of other useful plasticizers include benzoates of aliphatic polyols, such as neopentylglycol dibenzoate, diethylene glycol dibenzoate, and triethylene glycol di-2-ethylbutyrate; fatty acid amides, such as stearamide; aliphatic carboxylic esters, such as butyl oleate; oxyacid esters, such as methyl acetylricinolate and butyl acetylricinolate; pentaerythritol, sorbitols, polyacrylates, and paraffins.

The above described plasticizers may be used either individually or in combination of two or more thereof.

The flame retardant TPU resin composition of the invention may optionally contain an acrylic processing aid as long as it that does not impair the effects of the invention. The acrylic processing aid is exemplified by a homopolymer of a (meth)acrylic ester or a copolymer of two or more of (meth)acrylic esters.

The flame retardant TPU resin composition of the invention may contain an anti-drip agent as long as it does not adversely affect the effects of the invention. It should be noted, however, that it is not advisable to use a fluorine-containing anti-drip agent, in view of freedom from halogen and also because the physical properties of the TPU resin, particularly elongation would be reduced. It is particularly unfavorable to use polytetrafluoroethylene.

Examples of the fluorine-containing anti-drip agent include fluorocarbon resins, such as polytetrafluoroethylene, polyvinylidene fluoride, and polyhexafluoropropylene, and alkali metal or alkaline earth metal salts of perfluoroalkanesulfonic acids, such as sodium perfluoromethanesulfonate, potassium perfluoro-n-butanesulfonate, potassium perfluoro-t-butanesulfonate, sodium perfluorooctanesulfonate, and calcium perfluoro-2-ethylhexanesulfonate.

If desired, the flame retardant TPU resin composition of the invention may contain additives commonly used for synthetic resins as long as the effects of the invention are not impaired. Useful additives include crosslinking agents, antistatics, metal soaps, fillers, antifogging agents, anti-plate-out agents, surface treating agents, fluorescent agents, antifungals, bactericides, foaming agents, metal inactivators, parting agents, pigments, processing aids, and so forth.

When the flame retardant TPU resin composition of the invention contains optional components other than the TPU resin and components (A) to (D) (excluding resins other than the TPU resin), the amounts of the optional components are not particularly limited as long as the effects of the invention are not impaired. It is preferred that the total amount of the optional components be not more than 100 parts, more preferably not more than 50 parts, by mass per 100 parts by mass of the TPU resin.

The flame retardant TPU resin composition of the invention may contain a synthetic resin other than the TPU resin as a resinous component. Useful synthetic resins include thermoplastic resins, including α-olefin polymers, such as polypropylene, high density polyethylene, low density polyethylene, linear low density polyethylene, crosslinked polyethylene, ultrahigh molecular weight polyethylene, polybutene-1, and poly-3-methylpentene, and olefin copolymers, such as ethylene-vinyl acetate copolymers, ethylene-ethyl acrylate copolymers, and ethylene-propylene copolymers; halogen-containing resins, such as polyvinyl chloride, polyvinylidene chloride, chlorinated polyethylene, chlorinated polypropylene, polyvinylidene fluoride, chlorinated rubber, vinyl chloride-vinyl acetate copolymers, vinyl chloride-ethylene copolymers, vinyl chloride-vinylidene chloride copolymers, vinyl chloride-vinylidene chloride-vinyl acetate terpolymers, vinyl chloride-acrylic ester copolymers, vinyl chloride-maleic ester copolymers, and vinyl chloride-cyclohexylmaleimide copolymers; petroleum resins, coumarone resins, polystyrene, polyvinyl acetate, acrylic resins, polymethyl methacrylate, polyvinyl alcohol, polyvinyl formal, polyvinyl butyral; aromatic polyester resins, including polyalkylene terephthalates, such as polyethylene terephthalate, polybutylene terephthalate, and polycyclohexanedimethylene terephthalate, polyalkylene naphthalates, such as polyethylene naphthalate and polybutylene naphthalate, and linear polyester resins, such as polytetramethylene terephthalate; degradable aliphatic polyesters, such as polyhydroxybutyrate, polycaprolactone, polybutylene succinate, polyethylene succinate, polylactic acid, polymalic acid, polyglycolic acid, polydioxane, and poly(2-oxetanone); polyamide resins, such as polyphenylene oxide, polycaprolactam, and polyhexamethylene adipamide; polycarbonate, branched polycarbonate, polyacetal, polyphenylene sulfide, polyurethane, cellulose resins; and polyblends of these thermoplastic resins. Further included in useful synthetic resins are thermosetting resins, such as phenol resins, urea resins, melamine resins, epoxy resins, and unsaturated polyester resins, fluororesins, silicone resins, silicone rubber polyether sulfone, polysulfone, polyphenylene ether, polyether ketone, polyether ether ketone, and liquid crystal polymers. Also useful are isoprene rubber, butadiene rubber, acrylonitrile-butadiene copolymer rubber, styrene-butadiene copolymer rubber, fluororubber, and silicone rubber. Additional examples of the synthetic resin include olefin thermoplastic resins, styrene thermoplastic resins, polyester thermoplastic resins, nitrile thermoplastic resins, nylon thermoplastic resins, vinyl chloride thermoplastic resins, and polyamide thermoplastic resins.

These synthetic resins may be used either individually or in combination of two or more thereof. They may be used in the form of polymer alloy.

The above described synthetic resins may be used irrespective of molecular weight, degree of polymerization, density, softening point, solvent-insoluble content, degree of stereoregularity, presence or absence of catalyst residue, type and compounding ratio of monomers, type of catalyst for polymerization (e.g., Ziegler type or metallocene type), and the like.

Preferred of these synthetic resins described are ethylene polymers, such as high density polyethylene (HDPE), low density polyethylene (LDPE), and linear low density polyethylene (LLDPE); and ethylene copolymers, such as ethylene-vinyl acetate copolymers, ethylene-ethyl acrylate copolymers, ethylene-methyl acrylate copolymers, ethylene-acrylic acid copolymers, and ethylene-methacrylic acid copolymers.

When in using resins other than the TPU resin, the amount of the other resins is not particularly limited as long as the effects of the invention are not impaired. The amount of the other resins is preferably not more than 100 parts, more preferably not more than 50 parts, by mass per 100 parts by mass of the TPU resin.

In making the flame retardant TPU resin composition of the invention, the time to compound the TPU resin with the essential components (A), (B), and (C) and the optional component (D) is not particularly restricted. For instance, any two or more of components (A) to (D) may previously be mixed, and the resulting premix may be added to the TPU resin, or components (A) to (D) may separately be added to the TPU resin.

In the former case, each component to be premixed may previously be ground, or grinding may follow the premixing. The same manner of compounding described above applies to the resins other than the TPU resin and other optional components.

The flame retardant TPU resin composition of the invention can be molded to provide molded articles with excellent flame retardancy. The flame retardant TPU resin composition of the invention can be molded by any known molding techniques, such as extrusion, calendering, injection, rolling, compression, and blown-film extrusion, to provide articles of various forms, such as plates, sheets, films, or any other irregular shapes.

The flame retardant TPU resin composition of the invention and molded articles thereof find wide applications in various industrial fields, including electric & elecronics, communications, agriculture, forestry, fisheries, mining, construction, foods, fibers, clothing, remedy, coal, petroleum, rubber, leather, automobiles, precision equipment, lumber, building materials, civil engineering, furniture, printing, musical instruments, and so on. Specifically, the applications include stationery and OA equipment, such as printers, personal computers, word processors, keyboards, PDAs (personal digital assistants), telephone sets, copiers, fax machines, ECRs (electronic cash registers), calculators, electronic diaries, cards, holders, and writing tools; household electric appliances, such as laundry machines, refrigerators, vacuum cleaners, microwave ovens, lighting equipment, game machines, irons, and kotatsu; audio and visual equipment, such as TV sets, VTRs, camcorders, radio-cassette recorders, tape recorders, mini discs, CD players, speakers, and liquid crystal displays; electric and electronic components, such as connectors, relays, capacitors, switches, printed circuit boards, coil bobbins, semiconductor sealants, LED sealants, electric wires, cables, transformers, deflection yokes, distribution boards, and clocks; housings (frames, cases, covers, and enclosures) and parts of communication equipment and OA equipment; and automotive interior and exterior parts.

The flame retardant TPU resin composition of the invention and its molded products are also useful in various applications, including materials for gas (petrol) vehicles, hybrid vehicles, electrical vehicles, train cars, boats, ships, aircrafts, buildings, and houses, such as seats (stuffing and upholstery), belts, ceiling covering, convertible tops, arm rests, door trims, rear package trays, rugs, mats, sun visors, wheel covers, mattress covers, air bags, insulating materials, assist grips, assist straps, wire covering, electrical insulators, paints, coatings, overlays, flooring, inside corner moldings, carpet, wallpaper, wall covering, exterior covering, interior covering, roofing, decks, walls, pillars, floor plates, fences, frames and moldings, profiles for windows and doors, roof shingles, siding boards, terraces, balconies, soundproofing boards, heat insulating boards, and window boards; civil engineering materials; and housewares and sporting equipment, such as clothing, curtains, bed sheets, chip boards, fiber boards, carpet and rugs, doormats, sheets, buckets, hoses, containers, glasses, bags, cases, goggles, skis, rackets, tents, and musical instruments.

EXAMPLES

The invention will now be illustrated in greater detail with reference to Examples, but the invention is not deemed to be limited thereto. Unless otherwise noted, the compounding ratios in Table 2 below are given in terms of mass %.

Examples 1 to 3 and Comparative Examples 1 and 2

A flame-retardant TPU resin composition was prepared in accordance with the formulation shown in Table 2 using the silica shown in Table 1. The resulting composition was extruded at 200° C. to obtain pellets.

The pellets were injection molded at 190° C. to make 127 mm long, 12.7 mm wide, and 1.6 mm thick specimens.

Components (A) and (B) described in Table 2 were prepared as follows.

Preparation Example 1

Melamine pyrophosphate as component (A) was prepared by the reaction between pyrophosphoric acid and melamine at a molar ratio of 1:2.

Preparation Example 2

Piperazine pyrophosphate as component (B) was prepared by the reaction between pyrophosphoric acid and piperazine at a molar ratio of 1:1.

The specimens prepared in Examples 1 to 3 and Comparative Examples 1 and 2 were evaluated for flame retardancy by the flammability test in accordance with the procedure described below. The results obtained are shown in Table 2.

UL-94V Flammability Test Method:

Each specimen (127 mm long, 12.7 mm wide, 1.6 mm thick) was held with the long axis vertical. A flame of a burner was applied to the lower end of the specimen for 10 seconds and removed, and the flame duration was recorded. As soon as the specimen stopped burning, the flame was reapplied for an additional 10 seconds, and the flame duration was measured in the same manner as in the first flame application. Ignition of the cotton layer placed below the specimen by any drips of flaming particles was also observed.

The flame duration after each flame application and the ignition of the cotton layer were interpreted into a UL-94V flammability rating. The V-0 rating is the lowest flammability. The V-1 rating is less flame retardancy, and V-2 rating is still less flame retardancy. A specimen that was not interpreted into any of these ratings was rated "NR".

TABLE 1

|  | Silica | | | | |
| --- | --- | --- | --- | --- | --- |
|  | 1 | 2 | 3 | 4 | 5 |
| Preparation Process | wet | wet | wet | dry | dry |
| Oil Absorption (ml/100 g) | 215 | 245 | 300 | — | 150 |

TABLE 2

|  | Example | | | Comparative Example | |
| --- | --- | --- | --- | --- | --- |
|  | 1 | 2 | 3 | 1 | 2 |
| Urethane resin*[1] | 67.5 | 42.2 | 54.5 | 67.5 | 42.2 |
| Component (A): Melamine Pyrophosphate*[2] | 11.4 | 20.3 | 15 | 11.4 | 20.3 |
| Component (B): Piperazine Pyrophosphate*[3] | 17.1 | 30 | 20 | 17.1 | 30 |
| Silica 1 | 1.5 |  |  |  |  |
| Silica 2 |  | 5 |  |  |  |
| Silica 3 |  |  | 8 |  |  |
| Silica 4 |  |  |  | 1.5 |  |
| Silica 5 |  |  |  |  | 5 |
| Component (D): Zinc Oxide | 1.9 | 1.9 | 1.9 | 1.9 | 1.9 |
| Phenol Antioxidant*[4] | 0.1 | 0.1 | 0.1 | 0.1 | 0.1 |
| Phosphorus Antioxidant*[5] | 0.1 | 0.1 | 0.1 | 0.1 | 0.1 |
| Calcium Stearate (lubricant) | 0.1 | 0.1 | 0.1 | 0.1 | 0.1 |
| Glycerol Monostearate (lubricant) | 0.3 | 0.3 | 0.3 | 0.3 | 0.3 |
| Flame Retardancy | V-0 | V-0 | V-0 | V-2 | V-2 |

*[1]Ether-based polyurethane resin (MFI: 10-20 g/10 min)
*[2]Pyrophosphoric acid to melamine molar ratio = 1:2
*[3]Pyrophosphoric acid to piperazine molar ratio = 1:1
*[4]Tetrakis[3-(3,5-di-tert-butyl-4-hydroxyphenyl)propionic acid methyl]methane
*[5]2,2'-Methylenebis(4,6-tert-butylphenyl-2-ethylhexyl phosphite)

INDUSTRIAL APPLICABILITY

The invention provides a TPU resin having excellent flame retardancy without using a halogen flame retardant that generates harmful gas on combustion. The invention also provides a highly flame-retardant molded article that does not generate harmful halogen-containing gas on combustion.

The invention claimed is:

1. A flame-retardant thermoplastic polyurethane resin composition comprising a thermoplastic polyurethane resin and components (A), (B), and (C):
   (A) at least one melamine salt selected from the group consisting of melamine orthophosphate, melamine pyrophosphate, and melamine polyphosphate,
   (B) at least one piperazine salt selected from the group consisting of piperazine orthophosphate, piperazine pyrophosphate, and piperazine polyphosphate, and
   (C) wet process silica having an oil absorption of 200 ml/100 g or more;
   wherein said thermoplastic polyurethane resin has a melt flow index (MFI) of 3 to 60 g/10 min, the melt flow index (MFI) being measured at 190° C. and 10 kg in accordance with ASTM D1238.

2. The flame-retardant thermoplastic polyurethane resin composition according to claim 1, comprising 3 to 29 mass % of component (A), 9 to 46 mass % of component (B), and 0.01 to 10 mass % of component (C).

3. The flame-retardant thermoplastic polyurethane resin composition according to claim 1, further comprising zinc oxide as component (D).

4. A molded article obtained from the flame-retardant thermoplastic polyurethane resin composition according to claim 1.

5. The flame-retardant thermoplastic polyurethane resin composition according to claim 2, further comprising zinc oxide as component (D).

6. A molded article obtained from the flame-retardant thermoplastic polyurethane resin composition according to claim 2.

7. A molded article obtained from the flame-retardant thermoplastic polyurethane resin composition according to claim 3.

8. A molded article obtained from the flame-retardant thermoplastic polyurethane resin composition according to claim 5.

* * * * *